(12) United States Patent
Drzal et al.

(10) Patent No.: US 9,545,670 B2
(45) Date of Patent: Jan. 17, 2017

(54) COMPOSITIONS OF NANOPARTICLES ON SOLID SURFACES

(75) Inventors: Lawrence T. Drzal, Okemos, MI (US); In-Hwan Do, East Grand Rapids, MI (US); Hiroyuki Fukushima, Lansing, MI (US)

(73) Assignee: BOARD OF TRUSTEES OF MICHIGAN STATE UNIVERSITY, East Lansing, MI (US)

( * ) Notice: Subject to any disclaimer, the term of this patent is extended or adjusted under 35 U.S.C. 154(b) by 668 days.

(21) Appl. No.: 12/799,717

(22) Filed: Apr. 30, 2010

(65) Prior Publication Data
US 2010/0222211 A1 Sep. 2, 2010

Related U.S. Application Data

(62) Division of application No. 11/435,498, filed on May 17, 2006, now abandoned.
(60) Provisional application No. 60/689,658, filed on Jun. 10, 2005.

(51) Int. Cl.
*B22F 9/24* (2006.01)
*C01G 55/00* (2006.01)
*B82Y 30/00* (2011.01)
*B82Y 40/00* (2011.01)
*C01B 31/02* (2006.01)
*H01M 4/92* (2006.01)

(52) U.S. Cl.
CPC .................. *B22F 9/24* (2013.01); *B82Y 30/00* (2013.01); *B82Y 40/00* (2013.01); *C01B 31/02* (2013.01); *C01B 31/0253* (2013.01); *C01G 55/00* (2013.01); *H01M 4/921* (2013.01); *H01M 4/926* (2013.01); *B22F 2009/245* (2013.01); *B22F 2999/00* (2013.01); *C01P 2002/84* (2013.01); *C01P 2004/04* (2013.01); *C01P 2004/64* (2013.01); *Y02E 60/50* (2013.01)

(58) Field of Classification Search
CPC ............ Y02E 60/50; B22F 1/00; B22F 1/102; B22F 1/1025; B22F 9/00; H01M 4/96; H01M 4/625; B82Y 30/00; B82Y 40/00
USPC ....... 977/773, 734, 735, 742, 750, 752, 762, 977/775, 777; 428/402, 403; 423/414; 502/182, 185
See application file for complete search history.

(56) References Cited

U.S. PATENT DOCUMENTS

| 6,232,264 B1 | 5/2001 | Lukehart et al. |
| 6,346,136 B1 | 2/2002 | Chen et al. |
| 6,596,130 B2 | 7/2003 | Westman |
| 6,603,038 B1 | 8/2003 | Hagemeyer et al. |
| 6,846,345 B1 * | 1/2005 | Keller et al. ............ 75/255 |

(Continued)

FOREIGN PATENT DOCUMENTS

JP 2003-013105 1/2003

OTHER PUBLICATIONS

Guo, et al., "Carbon nanofibers supported Pt—Ru electrocatalysts for direct methanol fuel cells," Carbon, pp. 152-157. Published online Aug. 22, 2005.*

(Continued)

*Primary Examiner* — Matthew Matzek
(74) *Attorney, Agent, or Firm* — Marshall, Gerstein & Borun LLP

(57) ABSTRACT

A method for producing nanoparticles on a substrate using a metal precursor in an ionic liquid and microwave heating is described. The composite compositions are useful as catalysts for chemical reactions, fuel cell, supercapacitor and battery components, and the like.

10 Claims, 12 Drawing Sheets

(56) References Cited

U.S. PATENT DOCUMENTS

| | | |
|---|---|---|
| 7,390,472 B1 | 6/2008 | Singhal et al. |
| 7,615,169 B2 | 11/2009 | Strouse et al. |
| 2002/0136896 A1 | 9/2002 | Takikawa et al. |
| 2002/0159943 A1 | 10/2002 | Smalley et al. |
| 2004/0127621 A1 | 7/2004 | Drzal |
| 2005/0023957 A1 | 2/2005 | Kim et al. |
| 2005/0085379 A1* | 4/2005 | Ishihara et al. ............... 502/180 |
| 2007/0075052 A1 | 4/2007 | Fanson et al. |

OTHER PUBLICATIONS

Xue, X., "Novel preparation method of Pt—Ru/C catalyst using imidazolium ionic liquid as solvent", Electrochimica Acta 50 (2005) 3470-3478.

International Preliminary Report on Patentability for PCT/US2006/019392 dated Mar. 3, 2009.

\* cited by examiner

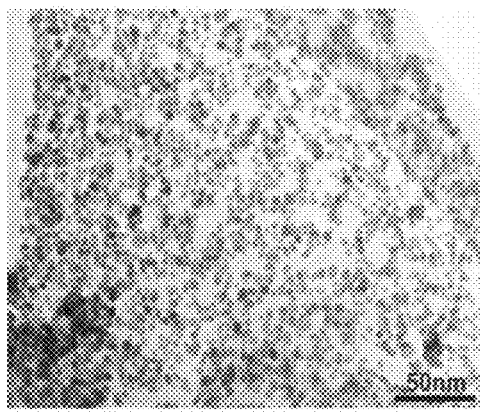 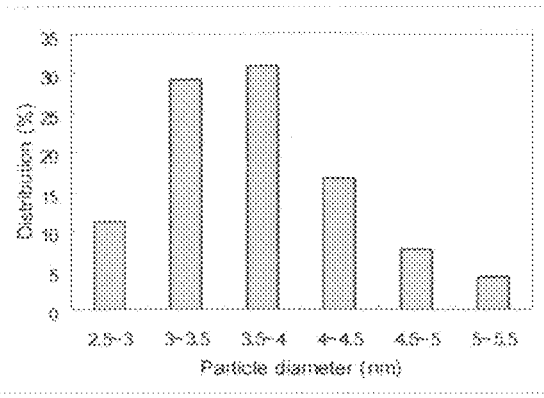
FIGURE 7A　　　　　　　　　FIGURE 7B
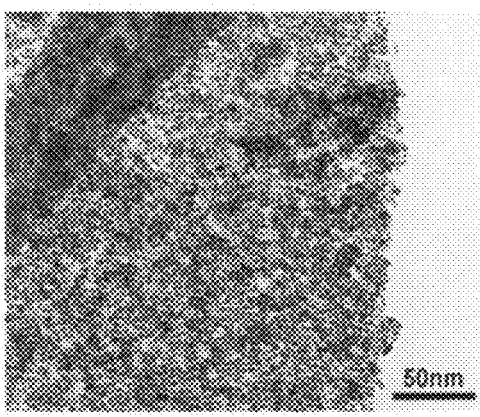 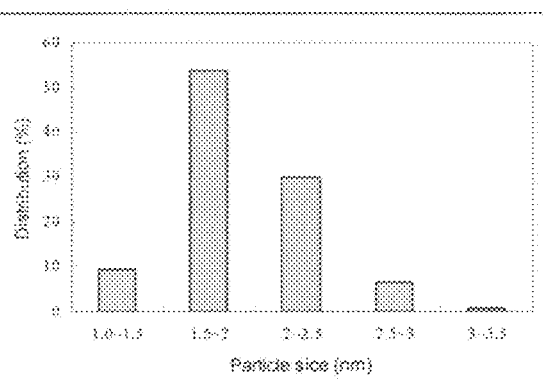
FIGURE 7C　　　　　　　　　FIGURE 7D
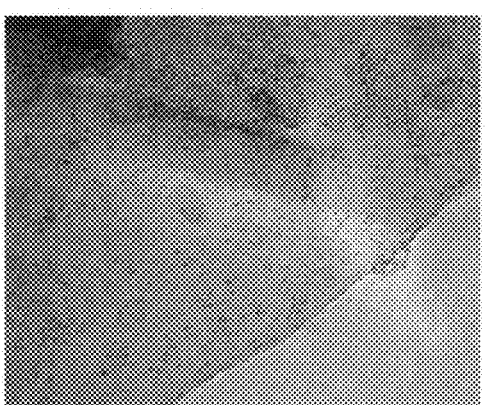 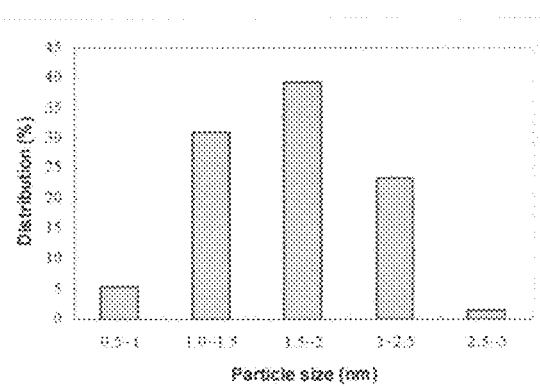
FIGURE 7E　　　　　　　　　FIGURE 7F

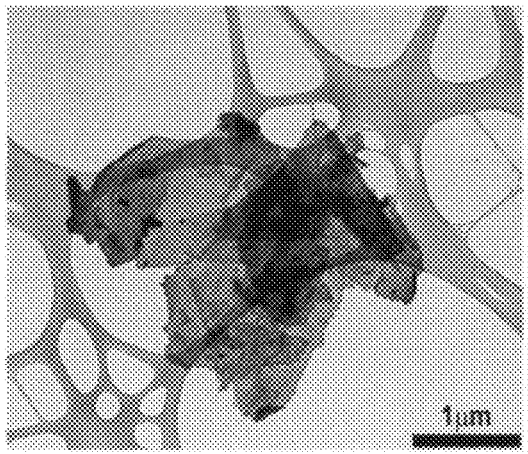
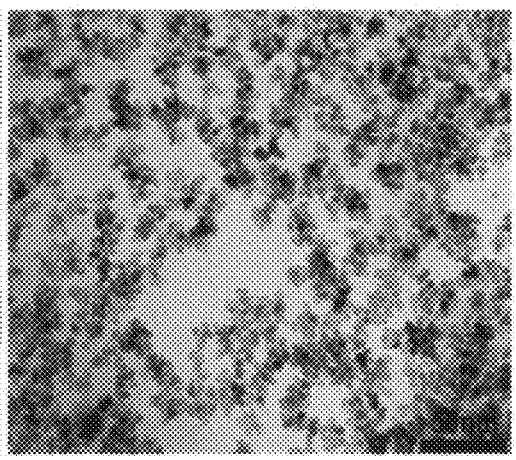
FIGURE 14A FIGURE 14B
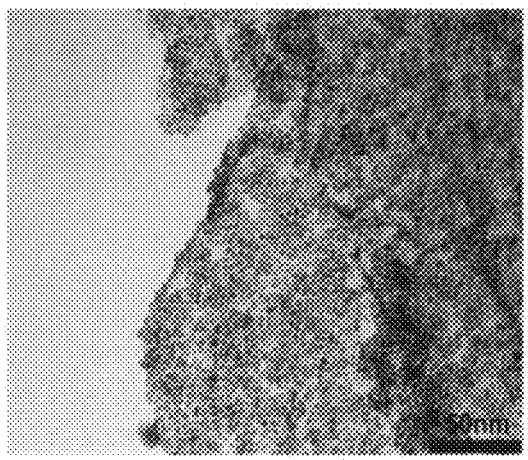
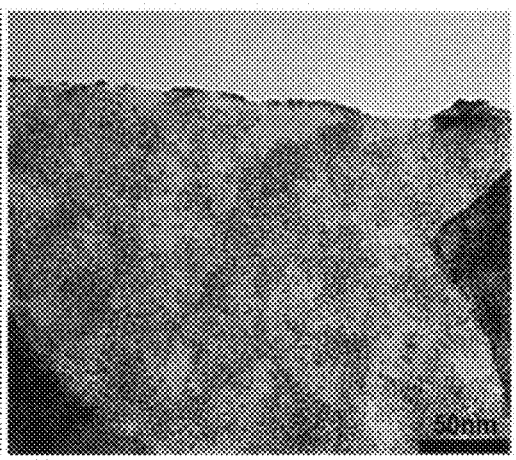
FIGURE 14C FIGURE 14D

COMPOSITIONS OF NANOPARTICLES ON SOLID SURFACES

CROSS-REFERENCE TO RELATED APPLICATIONS

This application is a division of U.S. application Ser. No. 11/435,498 filed May 17, 2006 and claims priority to U.S. Provisional Application Ser. No. 60/689,658, filed Jun. 10, 2005, both of which are incorporated herein by reference in their entireties.

STATEMENT REGARDING FEDERALLY SPONSORED RESEARCH OR DEVELOPMENT

Not Applicable

STATEMENT REGARDING GOVERNMENT RIGHTS

Not Applicable

BACKGROUND OF THE INVENTION (1) Field of the Invention

The present invention relates to a method for producing metal nanoparticles on a solid surface of a substrate. In particular, the present invention relates to nanoparticles of a metal deposited on nanoparticles comprising a carbon or graphite in various forms such as carbon black, fibers and nanotubes, for instance.

(2) Description of the Related Art

U.S. Pat. No. 6,596,130 to Westman generally describes a process for microwave associated chemical transformation of organic compounds using ionic liquids (IL). This reference is incorporated herein in its entirety, particularly in reference to the ionic liquids. Microwave reactors are well known to those skilled in the art.

OBJECTS

It is therefore an object of the present invention to provide a novel method for producing metallic nanoparticles on solid surfaces. In particular, it is an object of the present invention to provide a process and resulting composite which is economical and relatively easy to prepare. It is also an object of the present invention to provide a simple way of controlling metal nanoparticle formation on any substrate which is of the utmost importance for the performance of any industrial catalyst or electrocatalyst based on supported metals. These and other objects will become increasingly apparent by reference to the following description.

SUMMARY OF THE INVENTION

The present invention relates to a method for producing nanoparticles of metal deposited on a surface of a substrate which comprises: (a) providing solution of an ionic liquid in a reducing solvent, such as ethylene glycol, containing a precursor of the metal on the substrate; and (b) exposing the metal precursor in the ionic liquid to microwaves so as to reduce the metal precursor to nanoparticles of the metal which are deposited on the substrate. Preferably the substrate has a surface which comprises carbon on which the nanoparticles of the metal are deposited. Preferably the carbon is a graphite, a carbon black particle, a nanotube, or a carbon fiber. Also, preferably the carbon is a buckyball. Preferably the carbon has at least one dimension which is a nanodimension. Preferably the substrate is a nanoparticle which is less than 100 nanometers in at least one dimension. Preferably at least two of the metal precursors are provided in admixture in step (a).

The present invention also relates to a composite composition which comprises a substrate having nanoparticles of a metal deposited thereon. Preferably the nanoparticles of the metal are comprised of a noble metal alone or in combination with a transition metal. Preferably the nanoparticles of the metal are comprised of any metal alone or in combination with any other metal. Preferably the substrate is a nanoparticle having at least one dimension less than 100 nanometers. Preferably the substrate comprises a carbon. Preferably the substrate has a surface which comprises any solid on which the nanoparticles of the metal are deposited.

The substance and advantages of the present invention will become increasingly apparent by reference to the following drawings and the description.

DESCRIPTION OF DRAWINGS

FIGS. 7A to 7F show TEM micrographs and graphs of Pt particle size distributions of (7A, 7B) Pt/xGnP-N, (7C, 7D) Pt/xGnP-IM, and (7E, 7F) Pt/xGnP-M nanocomposites, where xGnP is exfoliated graphite nanoplatelet.

FIGS. 14A to 14D are TEM micrographs of (14A) PtRu nanoparticles covered on xGnP, (14B) PtRu/xGnP-N, (14C) PtRu/xGnP-IM, and (14D) PtRu/xGnP-M.

DESCRIPTION OF THE PREFERRED EMBODIMENTS

Figure 1A:
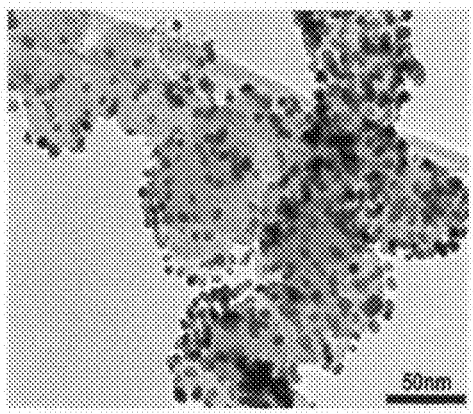
FIGS. 1A-1F are TEM micrographs and Pt graphs of particle size distributions of (1A, 1B) Pt/CB-N, (1C, 1D) Pt/CB-IM, and (1E, 1F) Pt/CB-M catalyst, where CB is carbon black, and where IM and M are specific ionic liquids. N is no ionic liquid.
Figure 1B:
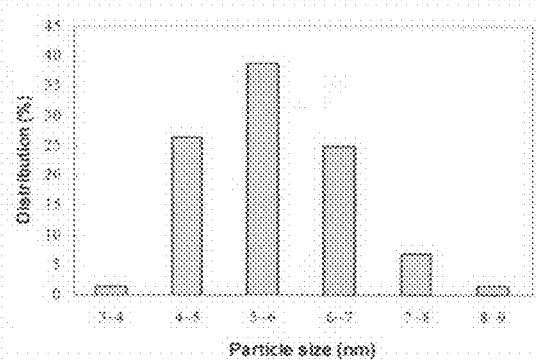
Figure 1C:
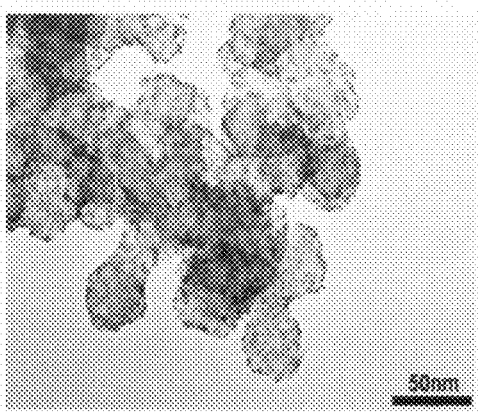
Figure 1D:
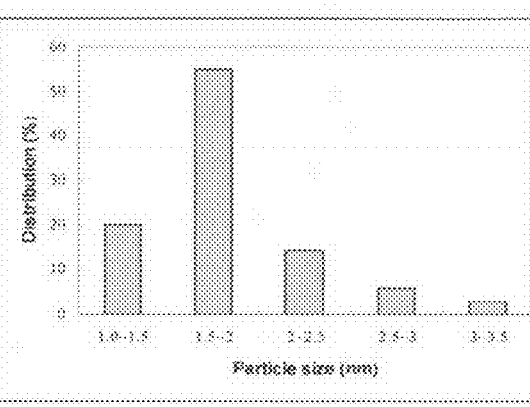
Figure 1E:
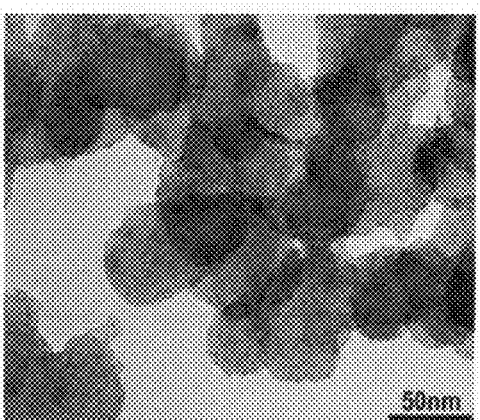
Figure 1F:
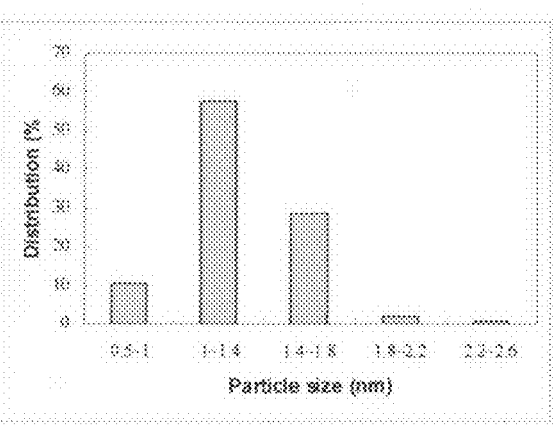

The following description includes terms which are defined as follows:

The term "nanoparticle" is defined as a particle wherein at least one dimension is 100 nanometers or less, preferably 10 nanometers or less (1 nanometer equals $10^{-9}$ meters).

The term "ionic organic liquid" is defined as a liquid organic compound with a cation and an anion and which can be heated to a temperature up to or over 180° C. in order to reduce an ionic metal precursor.

The term "ionic metal precursor" means an ionic metal salt which can be reduced by microwave energy in the presence of the ionic organic liquid. The salt can be organic or inorganic.

The term "solution" means a liquid composition containing a reducing compound such as ethylene glycol and an ionic liquid at a concentration of between about 1 and 30%.

The term "substrate" means a solid material which has a surface on which metal nanoparticles can be deposited. Preferably the substrate is some form of carbon. Most preferably the substrate has at least one nanodimension of 100 nanometers or less. The metals are preferably noble metals alone or in combination with transition metals which can act as catalysts.

The term "microwave" means wave energy in the microwave spectrum. The most common frequency for microwave ovens sold for food uses is 2.45 GHz; however, higher or lower frequencies between 1 MHz and 300 GHz are in commercial use and are well known to those skilled in the art.

The term "reducing liquid" means an organic liquid which can function as a reducing agent in the ionic organic liquid in the presence of the microwaves. Such compounds are, for instance, ethylene glycol or other polyhydric alcohols, which do not volatilize in the presence of the microwaves. Other organic liquids are diethylene glycol and triethylene glycol.

Microwave dielectric heating has numerous advantages, such as rapid heating, higher reaction rate, and the reduction of reaction time compared to conventional oil-bath heating methods. Hence the microwave-assisted process has opened up the possibility of fast synthesis of organic and inorganic materials. From this perspective, ionic liquids (ILs) provide great advantages due to large organic positive ions with a high polarizability. Thus, ILs provide a good medium as well as good additive for absorbing microwave very well, leading to further high heating rate. By using the advantages of ILs in the microwave heating process, a fast and simple way of synthesizing carbon-supported electrocatalysts for fuel cell applications, batteries, supercapacitors, catalytic materials for chemical processing, and the like is provided. The ILs can be used with microwaves to synthesize the Pt-based catalysts supported on various carbons as well as to tune the size of Pt-based metals regardless of the content of active metal phase. This process can be applied to any metal.

The Pt/C (20 and 60 wt. % Pt on carbons) and PtM (M=Ru, Ni, Fe)/C (20 wt. % PtM on carbons) catalysts were synthesized by microwave dielectric heating of ethylene glycol (ACS grade, J. T. Baker) solutions of Pt and M precursors as a comparative test without the ionic liquids of the present invention. Four different carbon materials were used; Vulcan XC-72R carbon black (CB, Cabot Co.), graphite nanofiber (GNF, Nanomirae Inc.), as-produced single-wall nanotube (A-SWNT, CarboLex Inc.), and exfoliated graphite nanoplatelet (xGnP, Michigan State University; U.S. patent application Ser. No. 10/659,577, filed Sep. 10, 2003 (Publication No. US2004-0127621-A1, published Jul. 1, 2004), which is incorporated by reference). A typical preparation consists of the following procedures: For Pt/C or PtM/C catalysts, 40 mg of a carbon support was dispersed in 20 mL of ethylene glycol by ultrasonication for 20 min. 1 mL of ethylene glycol solution of 26 mg $H_2PtCl_6.6H_2O$ (Aldrich) or a 1:1 molar ratio of $H_2PtCl_6.6H_2O$ and other metal precursors (for example, $RuCl_3.3H_2O$) was added and mechanically stirred for 20 min. The beaker containing Pt precursor, carbon, and ethylene glycol was heated in a household microwave oven (1300 W) for 50 s. After cooling down to ambient temperature, the resulting suspension was filtered and washed with acetone and dried at 100° C. in a vacuum oven for 12 hrs. Catalysts with 20 and 60 wt. % Pt and PtRu loading were prepared by varying $H_2PtCl_6.6H_2O$ and the content of other metal precursors in ethylene glycol solution. The catalysts obtained are called as the Pt/C—N or PtRu/C—N, where N is no ionic liquid.

For Pt/C or PtRu/C catalysts assisted with ionic liquids (IL), 1-butyl-3-methyl-imidazolium hexafluorophosphate [(BMI) ($PF_6$)] and 1-butyl-3-methyl-imidazolium acetate [(BMI)Ace] were purchased from Aldrich Chemical Co. and used as received. 0.025 mL~1 mL of [(BMI)($PF_6$)] or [(BMI)Ace] was dissolved in 20 mL ethylene glycol prior to the dispersion of carbons. Other steps are the same as for Pt/C—N or PtRu/C—N catalysts. The catalysts synthesized with the addition of [(BMI)($PF_6$)] and [(BMI)Ace] are denoted as Pt (or PtM)/C—IM and Pt (or PtM)/C-M, respectively. [(BMI)($PF_6$)] is immiscible with ethylene glycol and [(BMI)Ace] is miscible with the solvent. IM-IL refers to [(BMI)($PF_6$)] and M-IL indicates [(BMI)Ace].

The prepared catalysts were examined by transmission electron microscopy (TEM) on a JEOL 2200FS and JEOL 100CX. For microscopic investigation, the catalyst samples re-dispersed in acetone were deposited on Cu grids covered with a holey carbon film. The particle size distribution of Pt/C and PtRu/C catalysts metal particles on carbons was manually and statistically determined by counting at least 120 particles in each sample from randomly chosen area in the TEM images with SIGMASCAN software.

Example 1

Carbon Black (CB)-Supported Pt Catalyst

Figure 2:
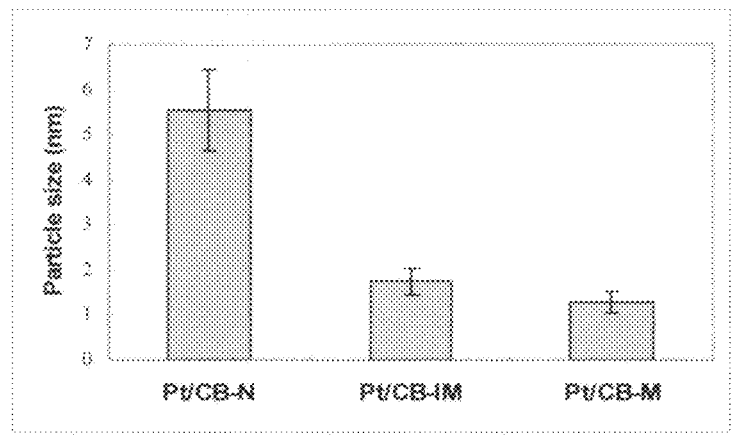
FIG. 2 is a graph showing the effect of the presence of ILs on the reduction of Pt size in CB-supported Pt catalysts.
Figure 3A:
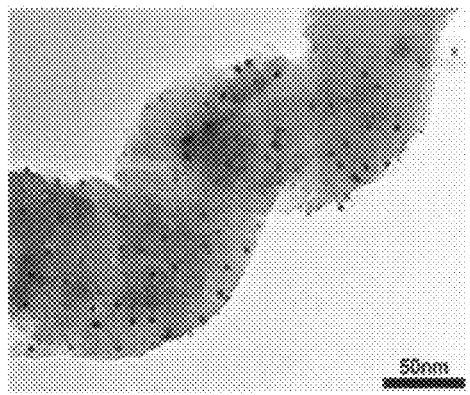
FIGS. 3A to 3F show TEM micrographs and graphs of Pt particle size distributions of (3A, 3B) Pt/GNF-N, (3C, 3D) Pt/GNF-IM and (3E, 3F) Pt/GNF-M nanocomposites, where GNF is graphite nanofibers.
Figure 3B:
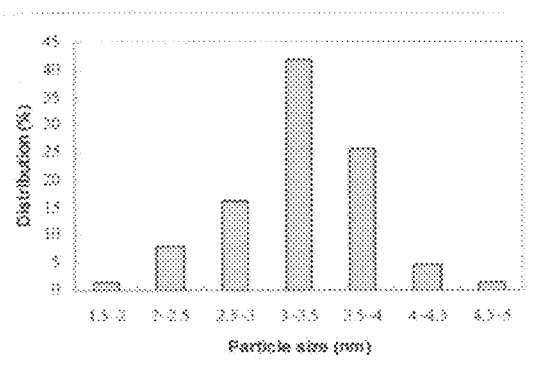
Figure 3C:
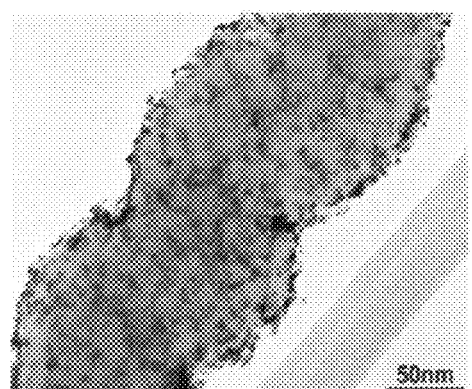
Figure 3D:
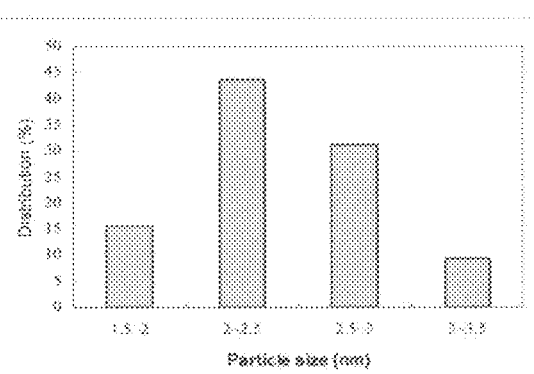
Figure 3E:
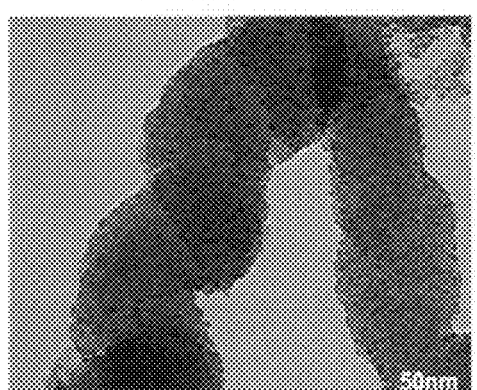
Figure 3F:
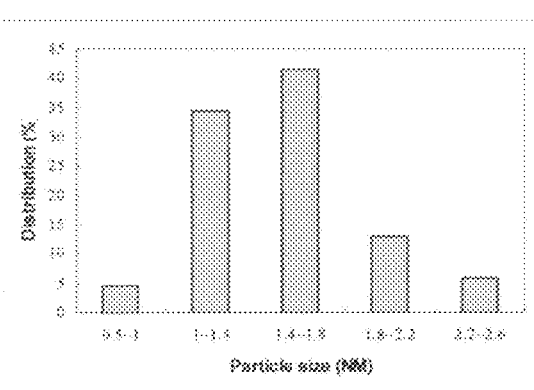

Morphologies and Pt size distribution of CB-supported Pt catalysts synthesized by microwave dielectric heating in the absence (1A) and the presence of ILs (0.5 mL; 1C, 1D) are shown in FIGS. 1A to 1F. The change of Pt size according to the addition of two different ILs, IM-IL and M-IL, is shown in FIG. 2. Pt particles were quite uniformly dispersed on CB in each sample. However, it is clear from (1A), (1C) and (1E) of FIG. 1 that ILs have a great effect on the reduction of Pt size of CB-supported catalysts. It is also obviously seen from (1B), (1D), and (1F) of FIGS. 1A to 1F that the Pt size distribution of Pt/CB-N is much broader than that of the catalysts prepared in the presence of ILs and Pt/CB-M showed the narrowest size distribution among the CB-supported catalysts. While the mean size of Pt in Pt/CB-N catalyst was about 5.56±1.54 nm, that of Pt in Pt/CB-IM and Pt/CB-M catalysts was about 1.75±0.74 nm and 1.30±0.4 nm, respectively. These results explain the introduction of IL in synthesizing CB-supported Pt catalyst is strikingly effective to reduce the Pt particle size and improve its dispersion on the surface of CB, which is expected to enhance the electrocatalytic activity of this catalyst for fuel cell applications.

Example 2

Spiral Graphite Nanofiber (GNF)-Supported Pt Catalyst

TEM morphologies of Pt/GNF-N, Pt/GNF-IM, and Pt/GNF-M and the size distribution of Pt phase corresponding to each sample are shown in FIGS. 3A to 3F. It has been known that there are difficulties in depositing Pt onto carbon nanofibers or graphite nanofibers via colloidal and conventional routes. The problem continues even in microwave process as in FIG. 3A. It was found that only 5-8 wt. % of Pt was deposited onto GNF in final product, even though Pt precursor corresponding to 20 wt. % metal loading for Pt/GNF-N in the starting mixture was added. The above fact confirms that Pt can not be efficiently supported on GNF even using conventional microwave-polyol process. However, it is noteworthy from FIGS. 3B and 3C that the presence of ILs contribute not only to increase Pt deposition onto GNF but also to narrow the size distribution of Pt particles. It is also noticeable that the agglomerates of Pt are rarely found in the case of Pt/GNF-M.

Figure 4:
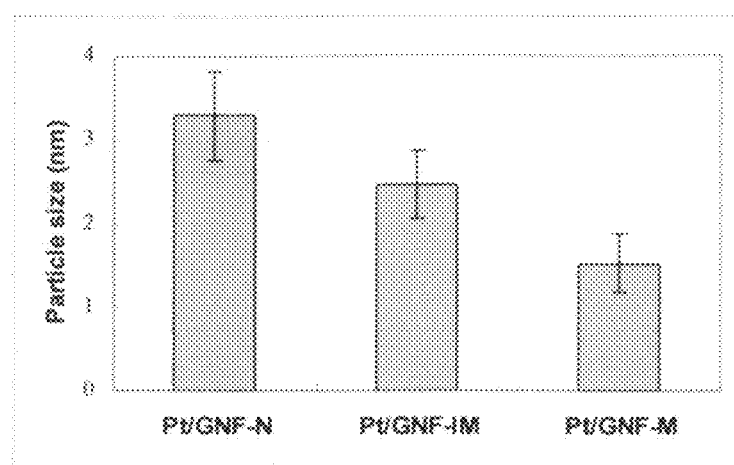
FIG. 4 is a graph which shows the mean size of Pt particles in N-Pt/sp-GNF, IM-Pt/sp-GNF and M-Pt/sp-GNF catalyst.

The effect of ILs on the reduction of Pt size for GNF-supported catalysts is clearly shown in FIG. 4. The Pt size of Pt/GNF-N, Pt/GNF-IM, and Pt/GNF-M catalysts is 3.3±1.1 nm, 2.46±0.7 nm, and 1.53±0.4 nm, respectively. The result indicates that M-IL miscible with ethylene glycol is more efficient in reducing Pt size than IM-IL immiscible with the solvent, resulting from more uniform adsorption of M-IL on GNF than IM-IL and thus the better contribution of M-IL for rapid homogeneous volumetric heating of the solvent.

Example 3

Figure 5:
FIG. 5 shows a TEM micrograph of Pt/a-SWNT-IM nanocomposite, where SWNT is single wall carbon nanotube.

As-Produced Single Wall Nanotube (a-SWNT)-Supported Pt Catalyst and Purified Multiwalled Carbon Nanotube (MWNT)-Supported Pt Catalyst Pt deposition directly on a-SWNT was attempted by microwave heating process assisted with IM-IL (0.5 mL). As in FIG. 5, Pt nanoparticles around 1.5~2 nm in average size were successfully supported on a-SWNT. Only a few Pt particles were found on a-SWNT in Pt/a-SWNT-N catalyst synthesized by microwave process without using IL (not shown here).

Figure 6A:
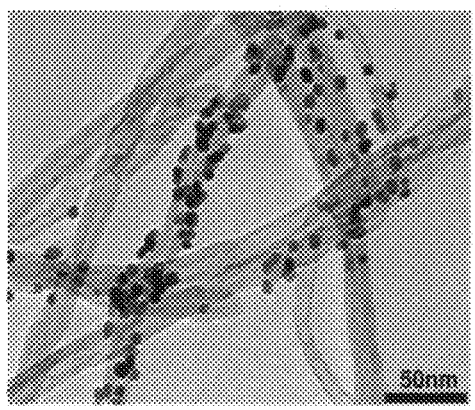
FIGS. 6A to 6F show TEM micrographs and graphs of Pt size distribution of (6A, 6B) Pt/MWNT-N, (6C, 6D) Pt/MWNT-IM, and (6E, 6F) Pt/MWNT-M nanocomposites, where MWNT is multi-walled carbon nanotube.
Figure 6B:
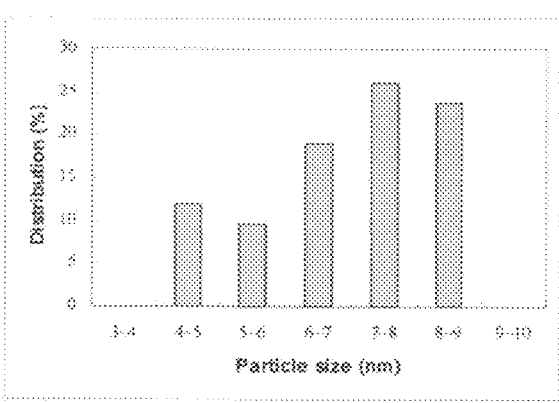
Figure 6C:
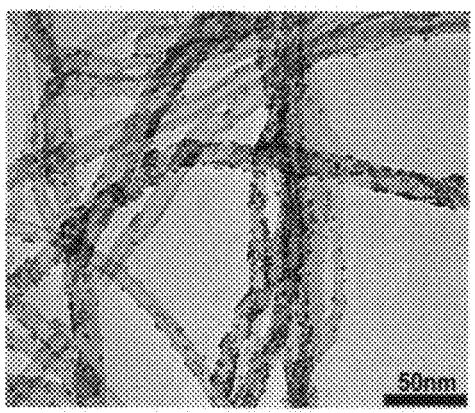
Figure 6D:
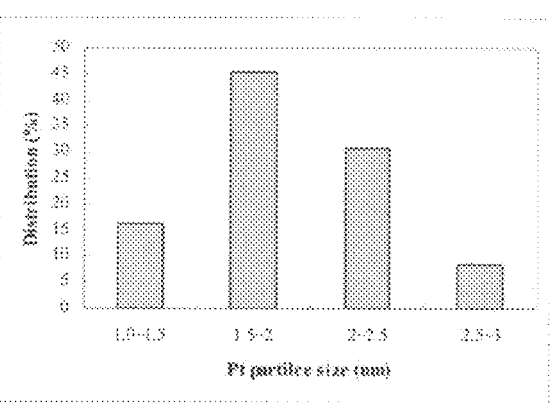
Figure 6E:
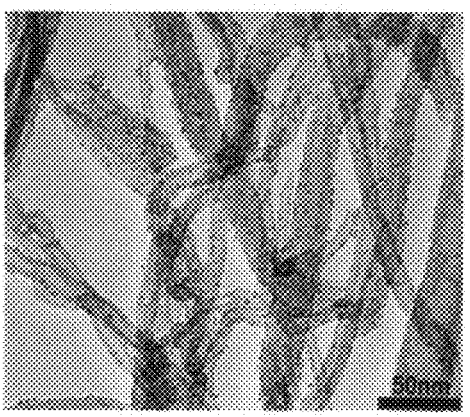
Figure 6F:
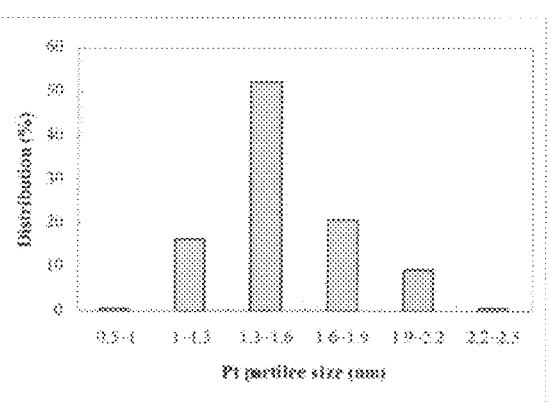

Purified but not oxidized MWNT was used as a support. The morphologies of Pt nanoparticles deposited on MWNT in the presence and the absence of an IL are shown in FIGS. 6A to 6F. Without a IL, MWNT could be decorated by a few Pt particles of 7.1 nm in average size as in a-SWNT and the size distribution of Pt particles was broad with the standard deviation of about 1.47 nm (FIGS. 6A and 6B). When 0.5 mL of IM-IL was added, Pt size was reduced to about 1.92±0.4 nm and much more Pt particles were present on MWNT compared to the sample prepared without an IL (FIGS. 6C and 6D). With the addition of 0.5 mL M-IL, the dispersion of Pt particles on MWNT was greatly improved with the decrease of Pt size to 1.54 nm (FIGS. 6E and 6F). These examples clearly show the possibility of depositing nanosized metal nanoparticles onto unfunctionalized or unoxidized SWNT and MWNT.

Example 4

Exfoliated Graphite Nanoplatelet (xGnP)-Supported Pt Catalyst xGnP is attracting attention as a new reinforcing material for composites and a support for catalysts. xGnP is much more cost-effective than new carbon nanostructures such as carbon nanotubes, carbon nanohorns, and fullerenes being considered as breakthrough materials in nanotechnology area. xGnP has superior properties such as excellent mechanical, high corrosion and oxidation resistance and high crystallinity which are characteristics required as a support for the electrodes of fuel cell. Here, in spite of high inertness of its surface, xGnP could be very effectively deposited with nanosized Pt by microwave process. Hence it is worth while to evaluate xGnP-supported Pt-based catalyst for fuel cell application. These are microwave expanded and pulverized graphite nanoplatelets as described in U.S. Published Application No. 2004-0127621-A1.

FIGS. 7A to 7F show the effect of IL on morphologies and Pt size distribution of xGnP-supported catalysts. Compared to Pt particles of 3.5~4.0 nm in average size obtained without a IL (FIG. 7A), the mean size of Pt is about 2.0 nm when 0.5 mL of IM-IL is introduced to ethylene glycol (FIG. 7B) and the further reduction of Pt size to 1.6 nm is achieved when 0.5 mL of M-IL is added (FIG. 7C). As a result of the presence of the ILs, the very high heating rate by microwave absorption increases the rate of reduction of the metal and thus smaller Pt particles are generated.

Figure 8:
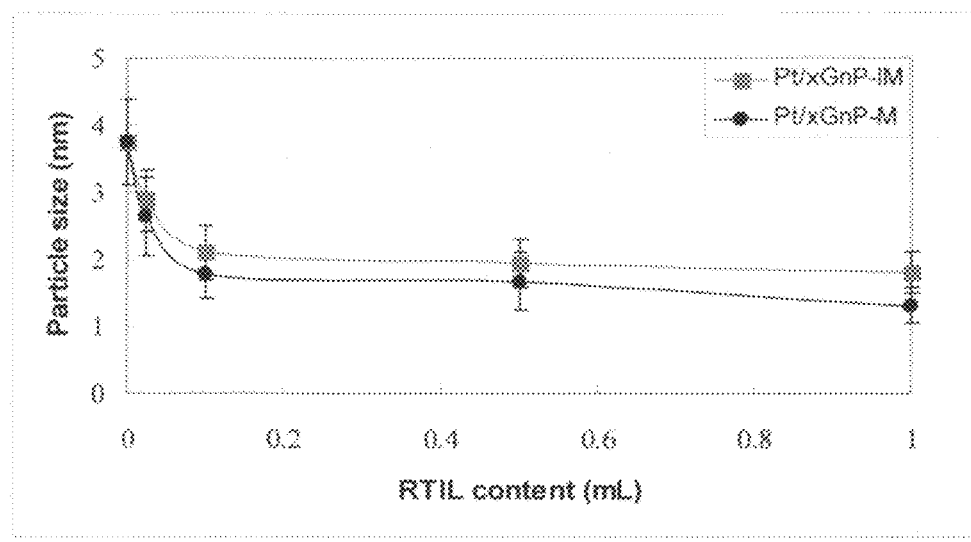
FIG. 8 is a graph showing the effect of types of IL on the reduction of Pt size supported on xGnP.

The effect of IL content on the particle size of Pt particles is shown in FIG. 8, where RTIL is room temperature ionic liquid. Addition of ILs results in the reduced size of Pt particles as well as the narrow size distribution of them. When ILs of only 0.025 mL was added, the mean size of Pt dropped below 3 nm. Further increase of IM-IL content beyond 0.5 mL did not seem to have a great effect on the Pt size reduction. However, M-IL kept reducing Pt size as its content increased.

Example 5

Pt/xGnP Nanocomposite with High Concentration of Pt

Figure 9A:
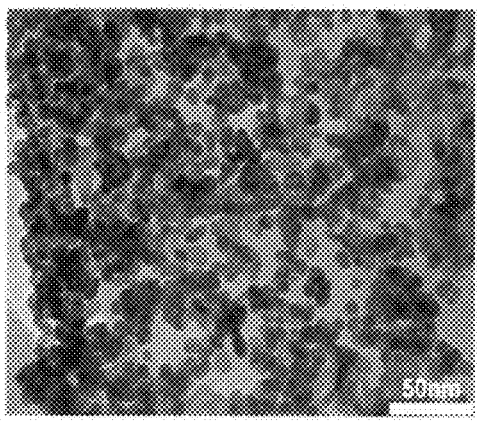
FIGS. 9A to 9D show TEM micrographs and graphs of Pt particle size distributions of (9A, 9B) Pt/xGnP-N and (9C, 9D) Pt/xGnP-M nanocomposites.
Figure 9B:
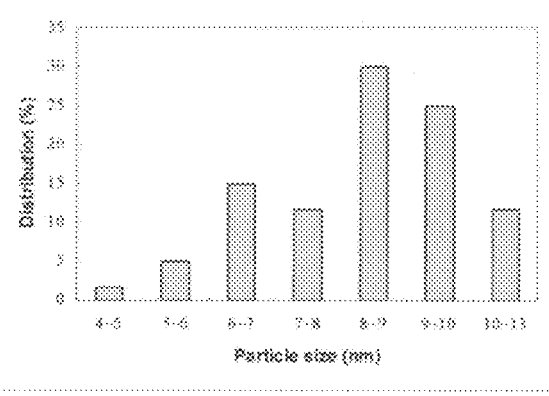
Figure 9C:
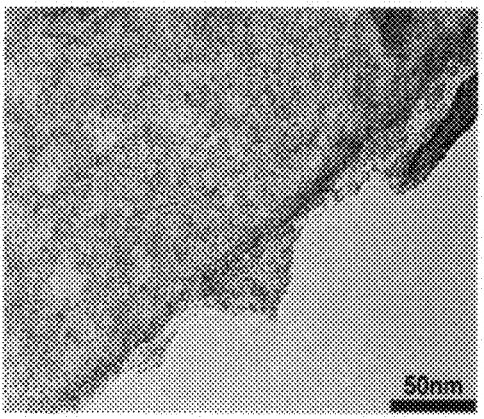
Figure 9D:
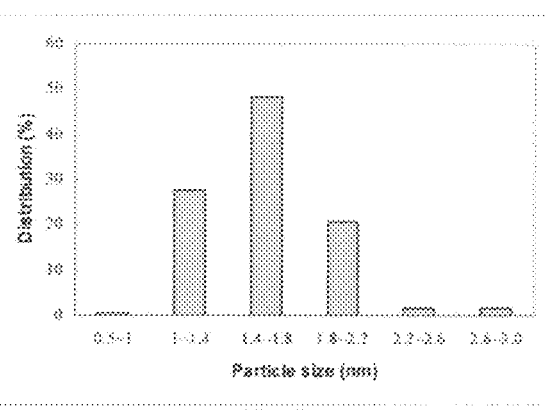

There are many studies underlining the difficulty of using conventional methods to prepare Pt catalysts with high metal loadings (>20 wt. %) and small particle size at the same time. The metal particle size for supported Pt catalysts with 10 wt. % and 30 wt. % Pt loading were 2.0 nm and 3.2 nm, respectively, but increased to 8.8 nm for a 60 wt. %. Pt catalyst. Therefore, the preparation of highly dispersed and loaded metal catalysts with small particle size has been a challenge. However, the challenge is accomplished by a simple method of adding IM-IL and M-IL in microwave-polyol process. The results for the sample with 60 wt. % Pt on xGnP are shown in FIGS. 9A to 9D. As seen in FIGS. 9A and 9B, Pt has very broad size distribution and a lot of Pt agglomerates are found. The average size of Pt was increased to 9~10 nm. The mean size of Pt strikingly decreased below 2.0 nm with narrow size distribution when the supported catalyst is synthesized in the present of M-IL (0.5 mL) (FIGS. 9C and 9D). There are no noticeable agglomerates of Pt. The result here suggests a simple way of tuning active surface area of Pt and catalytic activity of carbon supported Pt catalyst, no matter how much Pt is loaded.

Example 6

The Surface Area and the Dispersion of Pt Phase

Figure 10:
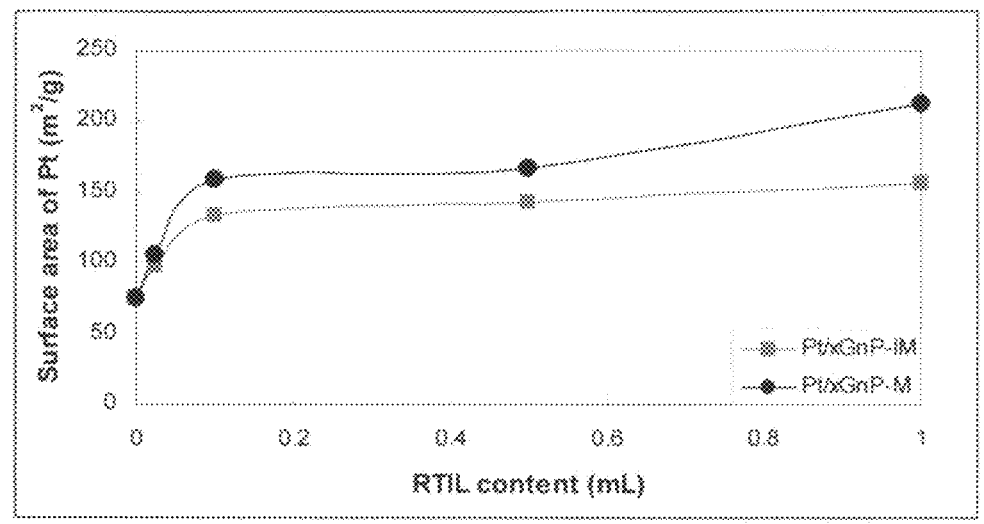
FIG. 10 is a graph showing the effect of ILs on the specific surface area of Pt phase.
Figure 11:
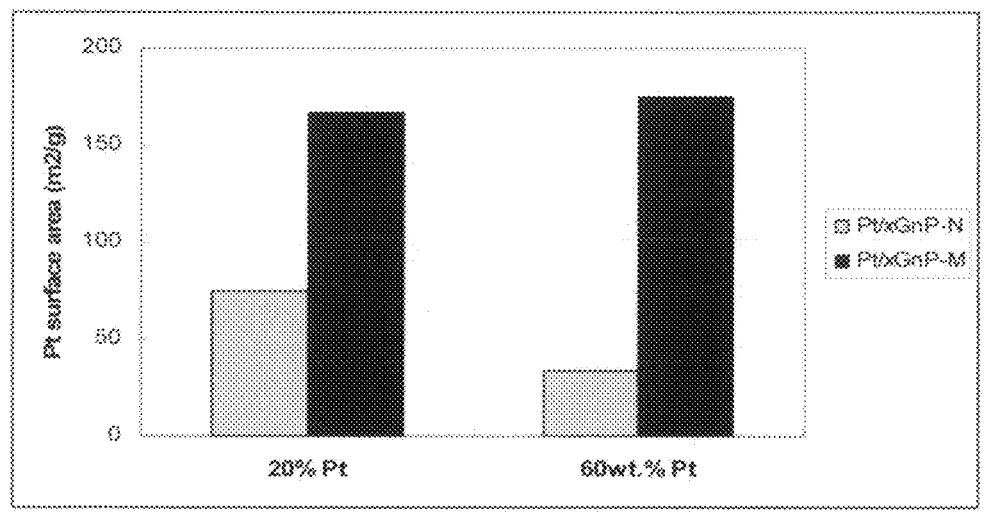
FIG. 11 is a graph showing the change of the Pt specific area in xGnP-supported catalysts with different Pt loading.

The specific surface area of Pt can be calculated by the Equation (1):

$$S = \frac{6000}{\rho d} \quad (1)$$

where S is the specific surface area of Pt, ρ is the density of metal Pt (21.41 g/cm³), and d is the diameter of the Pt particles, which is determined from TEM images. FIG. 10 shows the effect of ILs on the surface area of Pt in xGnP-supported catalysts with 20 wt. % Pt loading. When the catalysts are synthesized in the presence of both IM-IL and M-IL, the Pt surface area increased due to the reduction of Pt size. The amazing results are that the Pt surface area of Pt/xGnP-M catalyst synthesized by the addition of M-IL is almost three times larger than that of Pt/xGnP-N obtained without any IL and there seems to be room to increase the Pt surface area with further increase of M-IL content. FIG. 11 shows how much more effective microwave-assisted IL method improves the Pt surface area of the carbon-supported catalysts compared to conventional microwave heating. While Pt surface area of Pt/xGnP-N decreases with the increase of Pt loading, that of Pt/xGnP-M was unchanged or slightly increased with the increase of Pt. In the case of the supported catalyst with 60 wt. % Pt, the surface area of Pt/xGnP-M sample is five times larger than that of Pt/xGnP-N. When CB was used as a support, the presence of M-IL gives seven times higher in Pt surface area compared to the case with no addition of IL. These results confirm the fact that it is possible to produce Pt nanoparticles highly loaded onto various carbons at no expense of catalytically active surface area.

Figure 12:
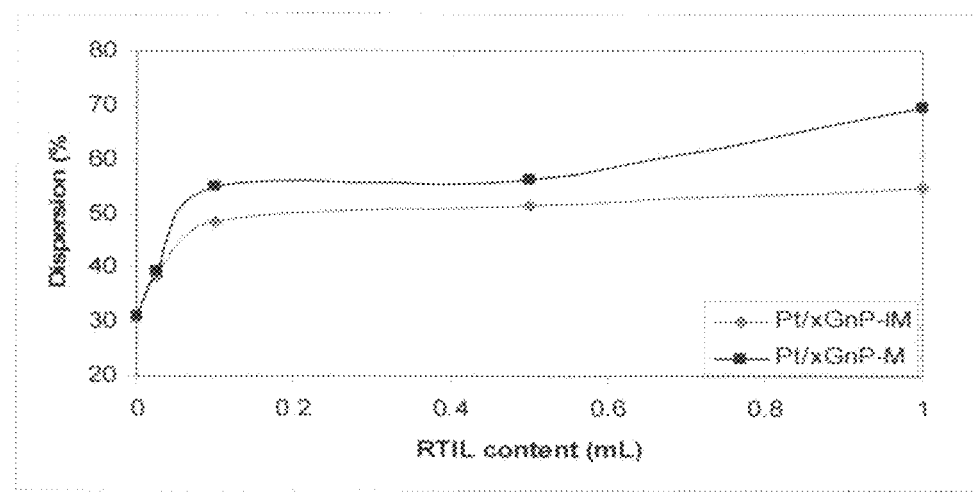
FIG. 12 is a graph showing the effect of ILs on the dispersion of Pt phase.

Assuming that all Pt particles are spherical, the surface average dispersion (D) of Pt, which is the ratio of the surface atoms to the total atoms within the nanoparticles, can be calculated by using Equation (2)~(4) for particles with small size (d>24 $d_{at}$):

$$D = \frac{2.64}{(d_{rel})^{0.81}}, \quad d_{rel} = \frac{d_{vs}}{d_{at}}, \quad d_{vs} = \left(\frac{\sum n_i d_i^3}{\sum n_i d_i^{2.19}}\right)^{1.23} \quad (2)\sim(4)$$

where $d_{at}$ is the Pt atomic diameter (0.278 nm) and $d_{vs}$ is the volume surface mean diameter of each particle. D can be used to estimate the Pt mass activity of the catalysts for the oxygen reduction reaction. The higher the value of D, the better the mass activity of the catalysts. FIG. 12 shows the effect of ILs on the Pt dispersion. The trend of D is similar to that of Pt surface area because both are related to particle size. The important point to be mentioned is that it is possible to increase Pt dispersion over 100% compared to D of Pt/xGnP-N by controlling the content of M-IL, which results in improving the electrocatalytic activity of carbon-supported Pt catalysts.

Example 7

PtM Alloy Catalyst Supported on xGnP

Strongly electropositive metals such as Au, Pt, Pd, Ag, and Rh can be reduced with a mild reducing agent under ordinary conditions, while more electronegative metals like Cu, Co, Ni, Fe, Sn, W, Cr, and No require a very strong reducing agent and frequently extreme conditions of temperature and pressure. The same principle is applied for the synthesis of PtM alloy particles, where M is metal in this case. Higher reaction temperatures, and longer reactions are usually required for the preparation of carbon-supported bimetallic PtM (M=Co, Ni, Fe, Sn, Cr, W, and Mo) catalyst which are known to increase the activity of supported catalyst as an electrocatalyst for fuel cell system.

Figure 13A:
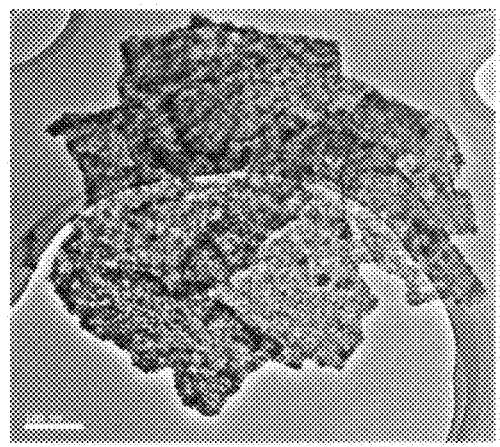
FIGS. 13A, 13B and 13C are TEM micrographs (13A to 13C) and EDX spectrum (13D) of PtNi/xGnP-IM.
Figure 13B:
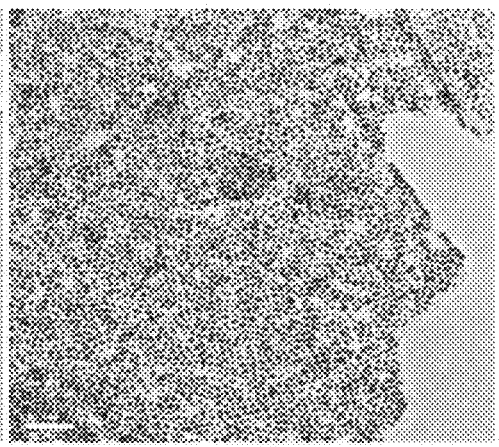
Figure 13C:
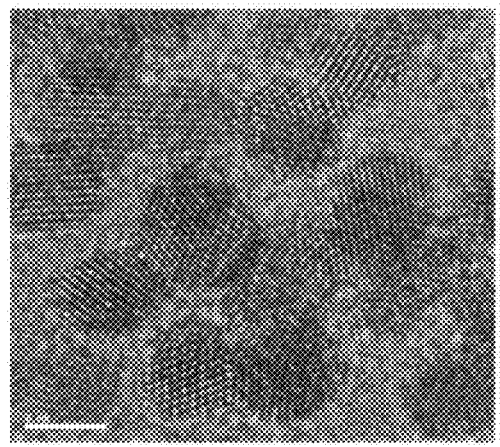
Figure 13D:
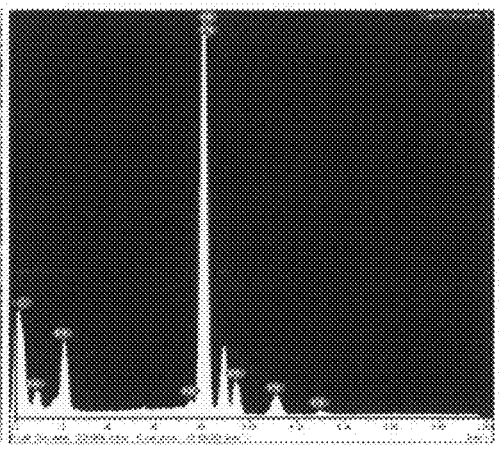

It was found that those bimetallic PtM nanoparticles can be successfully synthesized and deposited on various carbons rapidly with the help of a small quantity of IL which can assist to heat nonpolar solvents above their boiling point. Since the metal powder produced with polyol at a higher temperature is more crystalline than the sample reduced at lower temperature, IL brings another advantage. As an example, TEM images of bimetallic PtNi metal particles dispersed on xGnP included in FIGS. 13A to 13D with the energy dispersive x-ray (EDX) analysis result (13D). The atomic ratio of Pt and Ni is 3:1. Although total metal loading is close to 70 wt. %, the average size of PtNi metal particles is just 2~2.5 nm which is normally difficult to achieve with the use of chloride metal precursor for the production of bimetallic PtM catalysts. Well developed crystalline structure of PtNi particles can be seen in FIG. 13C. Similar morphologies are obtained from PtRu and PtFe particles deposited on xGnP. Evidences on bimetallic PtRu alloys dispersed on xGnP are in FIGS. 14A to 14D. The results of PtRu alloys on xGnP with or without an IL are similar to monometallic Pt on xGnP.

Pt and PtM catalysts can be deposited onto various carbon supports by microwave-assisted room temperature ionic liquid heating method. The size of Pt and PtM alloys supported on various carbons can be finely tuned by simply changing the amount of IL, regardless of the Pt and PtM loading level. An IL which is miscible with a reducing agent is more efficient in reducing the size of Pt and PtM than IL immiscible with the agent. The optimal catalytic performance of carbon-supported catalysts at a given concentration of active phase can be found. The improvement of catalytic activities of carbon-supported Pt catalyst is due to the enhanced surface area and dispersion of Pt phase.

The nanoparticle composites are useful as catalysts for chemical reactions, fuel cells, super capacitors and battery components. The very small size and uniformity of dispersion are highly effective for these uses.

It is intended that the foregoing description be only illustrative of the present invention and that the present invention be limited only by the hereinafter appended claims.

We claim:

1. A composite composition which comprises a substrate having nanoparticles of a metal deposited thereon, wherein:
   (i) the substrate comprises one or more of graphite particles, carbon nanotubes, carbon fibers, and carbon buckyballs;
   (ii) the substrate has a nanoparticulate structure with at least one dimension that is less than 100 nanometers;
   (iii) the deposited metal nanoparticles (A) are comprised of a noble metal comprising platinum, alone or in combination with a transition metal, (B) range in size between 0.5 nm and 3.5 nm, (C) have a loading ranging from 20 wt. % to 60 wt. % on the substrate, and (D) have a surface average dispersion ranging from 40% to 70%; and
   (iv) the composition is in the form of a carbon-supported catalyst.

2. The composition of claim 1 wherein the deposited metal nanoparticles have a median size between 1.3 nm and 2.5 nm.

3. The composition of claim 1 wherein the substrate comprises exfoliated graphite nanoplatelets.

4. The composition of claim 1 wherein the nanoparticles have been formed on the substrate by microwave irradiation of a precursor to the metal in a solution of an ionic liquid in a reducing liquid solvent.

5. A composite composition which comprises a substrate having nanoparticles of a metal deposited thereon, wherein:
   (i) the substrate comprises graphite particles;
   (ii) the substrate has a nanoparticulate structure with at least one dimension that is less than 100 nanometers;
   (iii) the deposited metal nanoparticles (A) are comprised of a noble metal comprising platinum, alone or in combination with a transition metal, (B) range in size between 0.5 nm and 3.5 nm, (C) have a loading ranging from 20 wt. % to 60 wt. % on the substrate, and (D) have a surface average dispersion ranging from 40% to 70%; and
   (iv) the composition is in the form of a carbon-supported catalyst.

6. The composition of claim 5 wherein the deposited metal nanoparticles have a median size between 1.5 nm and 2 nm.

7. The composition of claim 5 wherein the substrate comprises exfoliated graphite nanoplatelets.

8. The composition of claim 5 wherein the nanoparticles have been formed on the substrate by microwave irradiation of a precursor to the metal in a solution of an ionic liquid in a reducing liquid solvent.

9. A composite composition which comprises a substrate having nanoparticles of a metal deposited thereon, wherein:
   (i) the substrate comprises carbon black;
   (ii) the substrate has a nanoparticulate structure with at least one dimension that is less than 100 nanometers;
   (iii) the deposited metal nanoparticles (A) are comprised of a noble metal comprising platinum, alone or in combination with a transition metal, (B) range in size between 0.5 nm and 3.5 nm, (C) have a median size between 1 nm and 2 nm, (D) have a loading ranging from 20 wt. % to 60 wt. % on the substrate, and (E) have a surface average dispersion ranging from 40% to 70%; and
   (iv) the composition is in the form of a carbon-supported catalyst.

10. The composition of claim 9 wherein the nanoparticles have been formed on the substrate by microwave irradiation of a precursor to the metal in a solution of an ionic liquid in a reducing liquid solvent.

* * * * *